3,480,452
CORDIERITE CERAMIC PROCESS AND PRODUCT
Peter L. Fleischner, Piscataway, and Edward J. Smoke, Metuchen, N.J., assignors, by mesne assignments, to the United States of America as represented by the Secretary of the Navy
No Drawing. Filed Aug. 26, 1966, Ser. No. 575,928
Int. Cl. C04b 35/14; C03c 3/22
U.S. Cl. 106—39        3 Claims

ABSTRACT OF THE DISCLOSURE

Method of making a void free crystalline-glass ceramic from two frits, one being a thermally crystallizable $MgO-Al_2O_3-SiO_2$ glass and the other 10–30% of a bonding frit $MgO-CaO-BaO-Al_2O_3-SiO_2$ the resultant body contains cordierite crystalline phase.

---

The present invention relates generally to a ceramic composition and a method of forming high quality ceramics and, more particularly, to a method of making crystalline-glass ceramics from several powdered glasses.

Ceramic material having a low thermal expansion coefficient and having a true density, i.e., 100% quality, are recognized as being necessary for the development of a successful radome because a ceramic with a low coefficient of thermal expansion is conducive to high thermal shock resistance and a ceramic having even a small percentage of voids inhibits good radar transmission. It is, therefore, necessary that selected crystalline ceramics be made by a method which will insure a substantially void-free ceramic.

The ternary crystalline phase cordierite, $$2MgO \cdot 2Al_2O_3 \cdot 5SiO_2$$

and particularly the stable high temperature polymorph of cordierite, the alpha form, is characterized by a low coefficient of linear thermal expansion, approximately $1 \times 10^{-6}\,''/'''/°C$. over the temperature range 25° to 700° C. required for making such radome material. In making such crystalline phase cordierite, as well as other crystalline and crystal glass type ceramics, it is conventional to dry or wet mix finely divided mineral and chemical raw materials. The term "finely divided" includes a range of particle sizes from 0.02 to 80 microns. These particles are usually agglomerated and good mixing of these particles can not be achieved. The ceramics made by this method are only about 85% to 94% as dense as the densest ceramics. The voids in these ceramics are attributed to the poor mixing of the raw materials and this defect cannot be remedied by existing dispersion or mixing techniques. It has been found that by pre-reacting the raw materials this problem of poor mixing has been solved.

One method of pre-reacting raw materials, which is particularly adaptable to forming compositions such as cordierite, steatite and lithium alumino-silicates, entails melting the complete composition, quenching it to retain it as a glass, reducing this glass to a controlled particle size distribution and then using this material of a controlled particle size to form specimens which are fired conventionally. During this firing the crystalline phase is formed and with continued heating the specimen sinters to a matured ceramic. This method results in ceramics which are up to 99% of their true density, however, this method still does not allow for the production of a ceramic which is versatile from the ceramic processing aspect, nor does it allow for the wide variation in the engineering properties of the resulting ceramic.

In the fabrication of a cordierite body by the above-described, or by any other method, the following two factors must be considered:

(1) the maximum cordierite development for low thermal expansion; and
(2) the development of a sufficient liquid or glass phase to densify the resulting ceramic without adversely affecting the amount or development of the cordierite phase.

The achievement of the proper crystalline-glass proportion is essential to achieving a substantially void-free cordierite body and the above-described single-glass method does not adequately permit sufficient variation in the proportional relationships of the crystalline-glass phase because the only variation is achieved by varying the initial composition. This technique results in the development of other crystalline phases, as well as cordierite, upon devitrification. This frequently results in the failure to develop sufficient crystalline cordierite to dominate thermal expansion, and the other crystalline phases which are produced tend to increase the thermal expansion characteristic. A method of producing a crystalline cordierite ceramic, as well as other similar crystalline and crystalline-glass ceramics, is still required which will allow wide variation in the overall crystalline-glass proportion.

Accordingly, an object of the present invention is to provide a new and improved method of forming high quality ceramics.

Another object of the present invention is to provide an improved method for the devitrification of vitreous compositions.

Still another object of the present invention is the provision of an improved method for altering the crystalline-glass phase of crystalline or crystalline-glass ceramics.

A further object of the present invention is to provide a process for forming ceramics whereby the crystalline-glass phase relationship can be widely varied without affecting the development of the crystalline structure.

A still further object of the present invention is to provide a crystalline-glass ceramic which approaches 100% of its true density.

Another object of the present invention is to provide a crystalline-glass ceramic which is made by the divitrification of two separately formulated glasses.

Still another object of the present invention is to provide a crystalline-glass ceramic which is made from the devitrification of a mixture of separately formulated glasses combined in the proper proportion so that each glass will contribute a desirable characteristic to the final ceramic.

A further object of the present invention is to provide a cordierite ceramic which is made from separately formulated frits such that one type of frit essentially produces the desired cordierite phase upon devitrification and another type of frit produces a glassy phase which densifies the crystalline phase without adversely affecting a development of the crystalline structure.

Other objects, advantages and novel features of the present invention will become apparent from the following detailed description of the invention.

The present method basically consists of mixing quantities of a base glass with a bonding glass in a predetermined proportion such that upon devitrification of the mixture a ceramic is formed with the base glass predominantly forming a desired crystalline structure and with the bonding glass acting as a bond for the resulting crystalline structure.

The amount and quantity of the constituents for the base glass are selected so that upon devitrification the primary crystalline phase will lie within a desired area, i.e., mullite, cordierite and spinel, etc., on the phase diagram $MgO\text{-}Al_2O_3\text{-}SiO_2$. For example, when producing a ceramic having a cordierite structure the base glass has the following composition: $SiO_2$—51.4%; $Al_2O_3$—13.7%; MgO—34.9%. In all instances where a percentage of material is given, it is to be understood that this refers to percentage by weight, not percentage by volume. By selection of the $MgO\text{-}Al_2O_3\text{-}SiO_2$ ratio, the devitrification products may be varied and the predominant crystalline phase of the final product can be preselected. Thus, the above-described composition is used for example only and it will be recognized that the method can be performed with a primary glass composition that can be selected from any of the numerous compositions which will lend themselves to devitrification.

The composition of the bonding glass is selected so that it will both densify and bond the primary crystalline structure resulting from devitrification of the base glass. For example, the following range of compositions have been evaluated and found acceptable for use as a bonding glass when producing a ceramic having a cordierite structure formed from the above-mentioned base glass: $SiO_2$—49–61.4%; $Al_2O_3$—13–25%; MgO—3.6–8.7%; CaO—3.6–8.7%; BaO—3.6–8.7%. The bonding glass, like the base glass, is employed for illustrative purposes only and it will be understood that other proportions and other types of glasses can be employed which will densify and bond the resulting crystalline structure.

The materials in each glass are weighed and thoroughly mixed for a suitable period of time, preferably approximately 1 hour. All the mixing steps described can be adequately performed in a twin shell blender, however, other suitable equipment may be employed. In both the base and bonding glasses the alumina and silica are added as oxides while the baria, magnesia and calcia are added as carbonates. In order to decrease the bulk of the materials each material can be calcined at 1800° F., for example. Each glass mixture is then micropulverized in order to break all agglomerants and then thoroughly mix for a suitable period of time such as for approximtaely 1 hour. The micropulverizer is preferably turning at 8000 r.p.m. and is used with a 0.029″ round hole screen. Each glass mixture is then fritted in fire clay crucibles in a gas fired furnace, quenched in water, dried and pebble-milled to pass a 200 mesh. Quantities of the two types of frits are then added in the selected proportions, as illustrated in Table I, and thoroughly mixed using 10% water and 1% or 2% of a water-retaining agent such as ammonium alginate. It has been found that a mixture of 10–30% of the bonding glass frits and 70–90% of base glass frits will produce a cordierite ceramic having the desired density and thermal expansion characteristics. A suitable water-retaining agent is "Superloid" manufactured by Kelco Company, although many commercially available water-retaining agents would operate satisfactorily. The mixture of frits are then pressed into suitable specimen shapes and prepared for firing. A gas fired furnace or similar apparatus may be used to accomplish the step of firing. The total firing time is approximately 5 hours plus a 1 hour soaking period. The temperature range for firing is, as shown in Table I, between 2350° F. and 2650° F. During this firing, the crystalline phase is formed by devitrification and with continued heating the specimen sinters to a matured ceramic.

TABLE I

| Ceramic composition: | | | |
| --- | --- | --- | --- |
| Percent base glass frits | 90 | 80 | 70 |
| Percent bonding glass frits | 10 | 20 | 30 |
| Firing range (° F.) | 50 | 100 | 150 |
| | 2,600–2,650 | 2,525–2,625 | 2,350–2,500 |

The result of the two glass ceramics made by the above method has shown excellent properties. The ceramics possess low coefficients of linear thermal expansion, extended firing ranges, high density and zero solubility in water. These characteristics are due to several factors. The first is that the two glass method, in contrast to the single glass method, allowed for versatility as to the firing temperature, crystal content and size. In the two glass system, the glass which supplies the principal crystalline phase can be varied appreciably in content to thus vary the resulting percentage of crystalline development while the glass which supplies the bond can be varied in content, temperature-viscosity properties and will control to a marked extent the electrical and strength properties of the fired ceramic. In addition, the bonding glass can be designed to remain as a glass in the fired ceramic or it can be designed to devitrify, thus increasing the overall crystalline content. The second factor is that by pre-reacting the material which makes up each frit there is thorough distribution of each of the materials and the fine particle size distribution essentially eliminates any voids in the resulting frits. Further, the pebble-milling of each type of frits also insures fine particle size distribution which is conducive to attaining a high prefired bulk density and thus a higher fired bulk density. In addition, it is believed that the bonding glass forms, when devitrified, a low temperature glassy phase which densifies the cordierite body and is of such a nature that the cordierite development is not inhibited. It will thus be apparent that by the above method it is possible to produce ceramics having a maximum crystalline phase development and still achieve a density which is 99% of their true density.

It will also be apparent that the method of the herein described invention produces a ceramic suitable for use in a radome, for example, and which ceramic can be produced at widely varying firing temperatures. Thus, the method is versatile from the ceramic processing aspect. Likewise, the resulting engineering properties of the ceramic produced by the above-described method can be widely varied while still maintaining an essentially void-free ceramic. The specific cordierite ceramic produced illustrates that varying percentage of the crystalline phase can be produced in a ceramic without substantially affecting the true density, coefficient of linear thermal expansion or the percentage of moisture absorption.

Furthermore, it will also be apparent to one skilled in the art that although the method and the particular ceramic produced has been described in connection with the manufacture of radomes, it is not so limited and the material is equally applicable where other high quality ceramic materials are necessary, such as for electronic parts, ceramic abrasive materials and ceramic pistons and cylinders. While the method has been described with only two types of glass, a third glass could be employed to control either the ceramic process or the engineering properties of the resulting ceramic.

What is claimed is:
1. A method of making a substantially void-free crystalline-glass ceramic comprising the steps of:
producing at least two types of separately formulated glass frits, the first frit consisting substantially of, by weight, 51.4% $SiO_2$, 13.7% $Al_2O_3$, and 34.9% MgO and a second bonding frit consisting substantially of, by weight, 49–61.4% $SiO_2$, 13–25% $Al_2O_3$, 3.6–8.7% MgO, 3.6–8.7% CaO and 3.6–8.7% BaO, said bonding frit providing about 10-30%, by weight, of the total ceramic;
reducing the glass frits to a controlled particle size;
pressing the glass frits into a suitable shape; and
heating the mixture to a temperature between 2350° and 2650° F. to form a crystalline-glass ceramic.

2. A method according to claim 1 wherein the step of reducing the glass frits to a controlled size comprises pebble-milling each type of glass frit so as to pass a 200 mesh.

3. A substantially void-free crystalline-glass ceramic prepared according to claim 1 in which cordierite is the crystalline phase.

References Cited

UNITED STATES PATENTS

| | | | |
|---|---|---|---|
| 3,084,053 | 4/1963 | Arlett et al. | 106—39 |
| 3,291,586 | 12/1966 | Chapman et al. | 160—48 XR |
| 3,318,713 | 5/1967 | Pither | 106—39 |
| 3,365,314 | 1/1968 | Sack | 106—39 |
| 3,145,090 | 8/1964 | Buckner et al. | 65—18 |

HELEN M. McCARTHY, Primary Examiner

U.S. Cl. X.R.

15—33; 106—48, 52, 62; 264—125